April 6, 1965  L. H. PATCHEN  3,176,371
CONCRETE VIBRATOR AND FORMER

Filed Feb. 26, 1962  3 Sheets-Sheet 1

INVENTOR.
Lee H. Patchen
BY
Atty.

April 6, 1965   L. H. PATCHEN   3,176,371
CONCRETE VIBRATOR AND FORMER
Filed Feb. 26, 1962   3 Sheets-Sheet 2
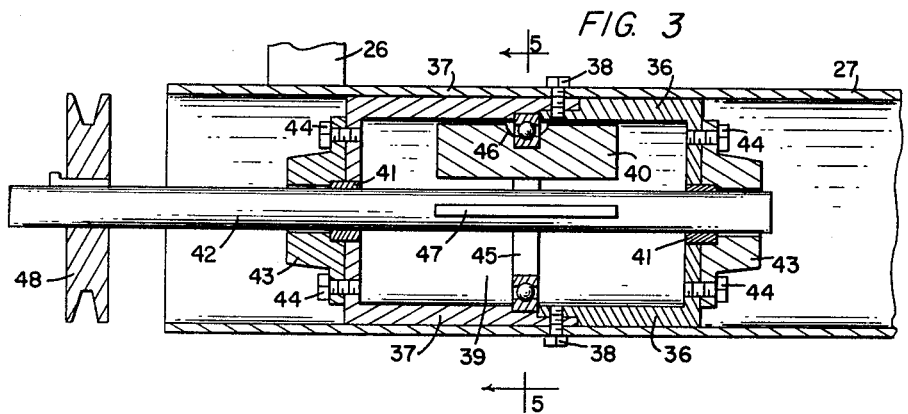
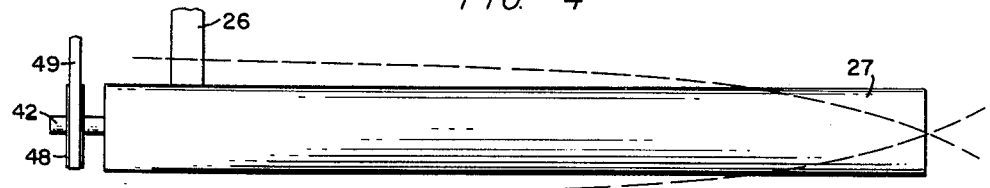
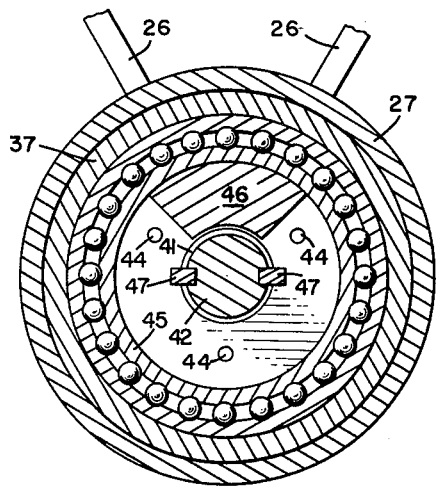
INVENTOR.
Lee H. Patchen
BY
Atty.

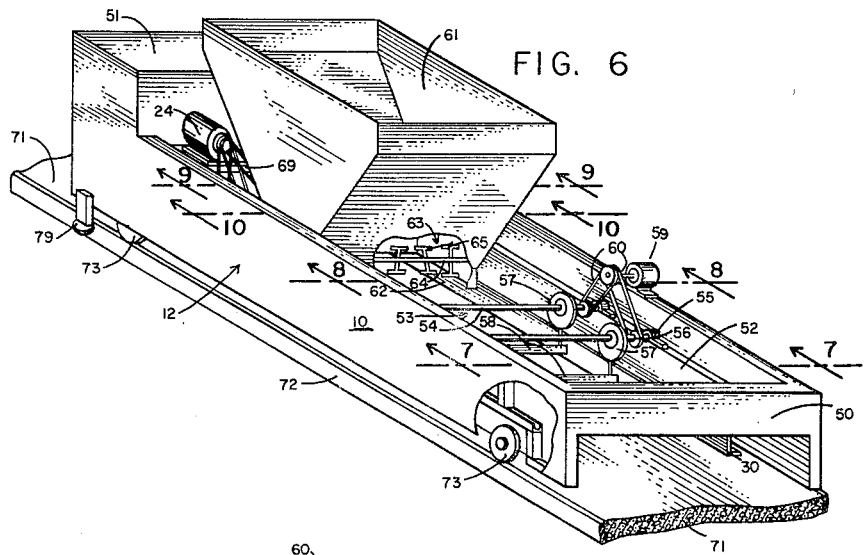
FIG. 6
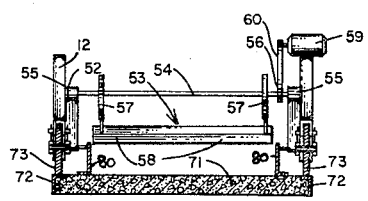
FIG. 7
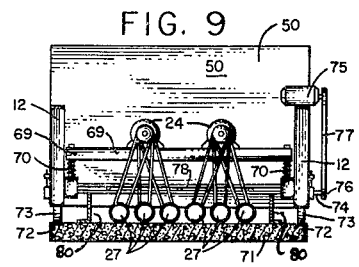
FIG. 9
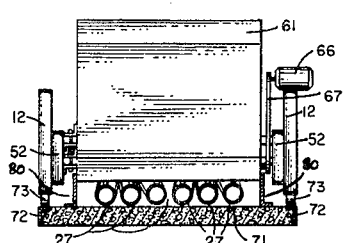
FIG. 8
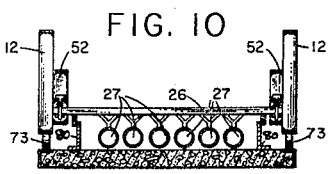
FIG. 10
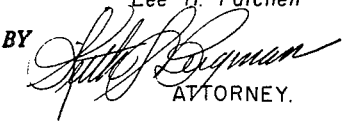

3,176,371
CONCRETE VIBRATOR AND FORMER
Lee H. Patchen, 3905 E. 16th Ave., Spokane, Wash.
Filed Feb. 26, 1962, Ser. No. 175,401
2 Claims. (Cl. 25—41)

This invention relates generally to a machine for the formation of elongate concrete shapes and more particularly to a machine forming such members with a hollow central portion by means of a forming head having substantially non-vibrating side forms and vibrating central forms.

Heretofore in the concrete industry, formed elongate concrete members for use as beams, girders, decking and the like, have become popular. Forming heads of various sorts have become known to create such members by extrusion. The product is cast from a reasonably dry concrete mixture, so that there will be no excessive slumpage after formation and to accomplish this it is necessary to quite vigorously vibrate the product at the time of formation so that it will create a unified mass upon setting. In the past, such vibration has been applied to the cast product about all or part of its external periphery and this has had a tendency to make the forming of such products inaccurate and the outside thereof loosened and unconsolidated.

It is an object of my invention to provide a forming head for elongate concrete products that has substantially non-vibrating external forms.

It is a further object of my invention to provide a device of the nature aforesaid with elongate internal vibrating forms.

It is a further object of my invention to provide such a device wherein said internal forms have substantially no vibration at the end from which the product formed thereover passes.

It is a further object of my invention to provide a vibrator, of the eccentric type, wherein the eccentric weight is carried by an outer shell rather than a central axle.

It is a further object of my invention to provide a device of the nature aforesaid of new and novel design, and of simple and economic manufacture.

For further comprehension of the invention and of the objects and advantages thereof, reference is now made to the following specification and accompanying drawings and appended claims, wherein the various novel features and a specific embodiment of my invention are more particularly set forth.

In the accompanying drawings, which form a part of the specification, and in which like numbers of reference refer to similar parts throughout:

FIGURE 3 is an enlarged cross-sectional view of the vibrator of my invention, showing the construction and various parts thereof.

FIGURE 4 is a semi-diagrammatic representation of the tuned vibration of an internal forming member of my invention.

FIGURE 5 is a vertical cross-sectional view of the vibrator illustrated in FIGURE 3, taken on the line 5—5 thereon in the direction indicated by the arrows.

FIGURE 6 is a surface isometric view of a form of my invention adapted to move upon or over a stationary pallet.

FIGURE 7 is a vertical cross-sectional view of FIGURE 6, taken on the line 7—7 thereon in the direction indicated by the arrows, showing the top finisher assembly.

FIGURE 8 is a vertical cross-sectional view of FIGURE 6, taken on the line 8—8 thereon in the direction indicated by the arrows, showing the hopper and forming portion.

FIGURE 9 is a vertical cross-sectional view of FIGURE 6, taken on the line 9—9 thereon in the direction indicated by the arrows, showing the vibrator motors and their mounting.

FIGURE 10 is a vertical cross-sectional view of FIGURE 6, taken on the line 10—10 in the direction indicated by the arrows, showing the mounting of the vibrating formers.

Figure 1:
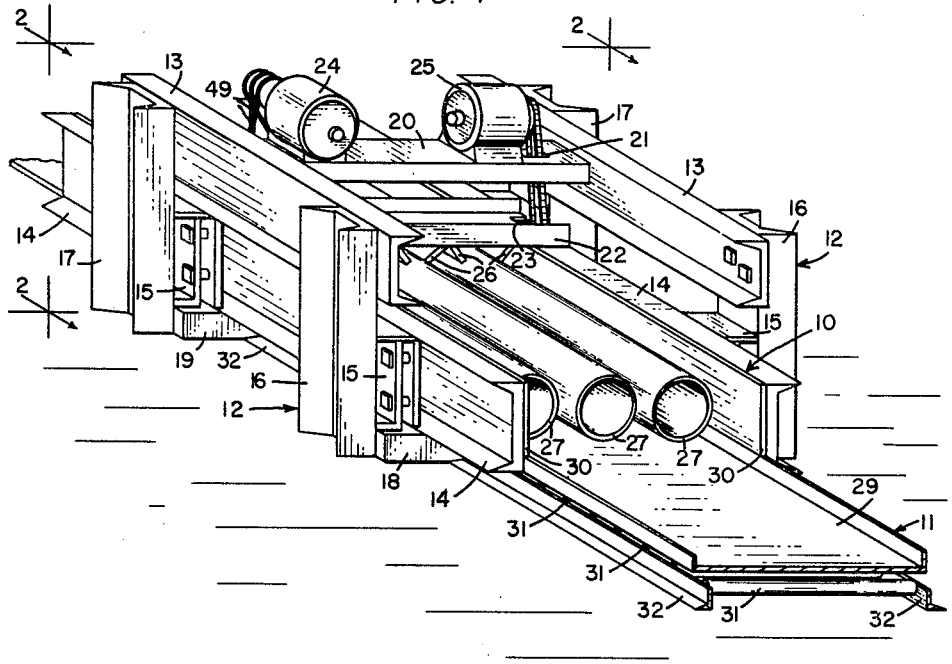
FIGURE 1 is an isometric surface view of a stationary form of forming head of my invention, having a pallet in place thereunder.
Figure 2:
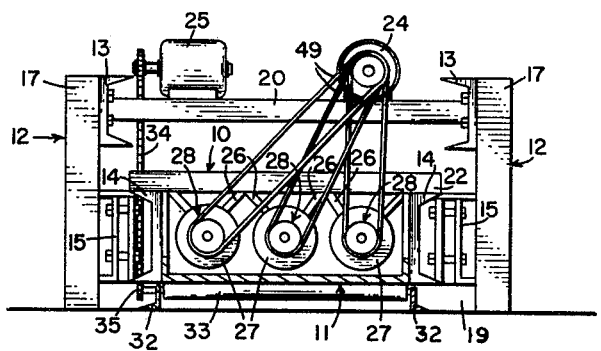
FIGURE 2 is a vertical cross-sectional view of the forming head of FIGURE 1 taken on the line 2—2 in the direction indicated by the arrows thereon.

Referring now to the drawings in more detail, and particularly to that of FIGURE 1, there will be seen the forming head 10 of my device in position over the moving pallet 11.

The forming head 10 comprises the two similar side members 12 having the upper horizontal channel 13 and lower horizontal channel 14 structurally connected by the bracket 15 to the forward upright 16 and rearward upright 17. The upper channel 13 may conveniently be connected to the uprights 16, 17 by welding, but I prefer to connect the lower channel 14 by bolting with a bracket 15, as illustrated, to provide for simple and easy assemblage.

The side members 12 structurally communicate with each other by means of the forward bottom cross-piece 18 and rearward bottom cross-piece 19, each communicating with and fastened to the lower portion of the respective uprights 16, 17. The vertical height of the bottom cross-pieces 18, 19 should be such that their uppermost portions will not project above the top of the pallet rollers 31 so that the pallet plate 29 may freely roll across them.

The upper channels 13 of the side members 12 are connected by the crosspiece 20, structurally communicating therewith, which also serves as a motor mount. This member 20 is provided with an appropriate hole 21 through which pallet belt 34 may pass.

Immediately below the cross-piece 20, supported and fastened on the top of the opposed lower channels 14 is the cross-piece 22, structurally communicating therewith, which serves as a vibrator support. This member must have an appropriately sized and positioned hole 23 adapted to allow for passage of the pallet belt 34.

The motor 24, providing power to the vibrator 28, is rigidly mounted to the upper portion of the cross-piece 20. The motor 25 providing motive power for the pallet 11 is mounted at the other end of said member in such fashion that its driving belt 34 may function through the holes 21, 23 in the two support members.

The vibrator tubes 27 are elongate, thin-walled, hollow pipes of the nature illustrated, supported below the cross-piece 22 by the short vibrator support members 26. The dimensioning, positioning and size of these members 27 are most critical. These physical attributes of the members should be such, as determined by methods well known in the physical and engineering sciences, that the nodal point of the natural frequency vibrations of the vibrator tubes 27 is at the forward extremity thereof, as illustrated in FIGURE 4, whereas the period of maximum amplitude of the vibration is at, or substantially at, the rearward portion near the supports 26.

The pallet member 11 comprises the pallet plate 29, having upwardly extending side members 30 to keep concrete and debris from falling off. This member 29 is supported upon the elongate cylindrical rollers 31 journaled by appropriate bearings in two similar side members 32, which are supported upon some stable support (not shown). The pallet 29 is moved, relative to the forming head 10, by driving rolls 33 journaled in the side members 32 in a fashion similar to that of the rollers 31. One or more of such driving rolls 33 are powered by the motor 25 acting through the belt 34 to the pulley 35 now rotatably carried by the driving roll 33.

The construction of the vibrator 28 is best shown in the cross-sectional views of FIGURES 3 and 5. It comprises the two-piece closed cylinder formed by the forward body member 36 and rearward body member 37 held in structural communication by means of the studs 38 passing through the mortised joining edges of said members. These members enclose the hollow, cylindrical chamber 39, within which the eccentric weight 40 rotates. Both the forward body member 36 and rearward body 37 are provided with the central axially aligned bearings 41, adapted to receive the cylindrical driving shaft 42. The bearings are held in position by the bearing cap 43, fastened to the respective body members 36, 37 by the studs 44.

An annular recess is milled in the forward portion of the rearward body member 37, adapted to receive the outer race of the ball bearing 45. This recess should be so positioned for ease of construction, that the bearing 45 is held in place by the rearwardly projecting shoulder of the forward body member 36 when in an assembled position, as illustrated in the drawings of FIGURE 3. A sector shaped eccentric weight 40 is provided with a recess 46 of size and shape adapted to allow the weight 40 to fit about the inner race of the ball bearing 45 and be supported thereby, yet being sufficiently shallow so that the cylindrical outer surface of the weight 40 does not touch the inner surface of the body members 36, 37, and is thusly free to rotate within the chamber 39 without friction therebetween. The recess 46 should be so shaped in relation to the size of the weight 40 so that when in an assembled position the weight 40 cannot move out of the aforesaid position and become loose within the chamber 39.

Two diametrically opposed, radially projecting keys 47 are provided in the driving shaft 42, immediately radially inward from the ball bearing 45. These keys should be of such size and shape as to require the weight 40 to rotate when the driving shaft 42 rotates.

The driving shaft 42 is provided with the non-rotatably mounted pully 48, adapted to receive the belt 49 which transmits power between said pully 48 and the motor 24.

I prefer to have the external dimensions of the vibrator 28 such that it will just fit within the rearward portion of the vibrator tube 27. In this case, I then prefer to provide holes in the vibrator tube 27 to allow the studs 38 to be inserted through the vibrator tube 27 and the forward body member 36 and rearward body member 37 to hold the entire assemblage together.

In operation, my machine is assembled, as shown in FIGURE 1, and relatively dry concrete of an appropriate high cement mixture is placed about the vibrator tubes 27 and on top of the pallet 11. The depth of the concrete may be regulated by hand or an appropriate mechanical screed (not shown). The motors 24, 25 are then put into operation and the vibrator tubes 27 commence their operation to form a dense compact homogeneous product. The pallet 11 is moved forward under the forming head 10 at an appropriate speed to carry the product away as it is formed. Concrete products may be made by this machine in either continuous or discrete pieces.

It should be noted from the structure heretofore recited, that it is only necessary for the pallet member 11 to move relative to the forming head 10 for my invention to operate. In the specific embodiment set forth, I have moved the pallet relative to a stationary forming head, however, the device will function equally well by making the obvious mechanical changes to move the forming head relative to a stationary pallet, as illustrated in FIGURE 6, et seq.

Referring now to FIGURE 6, et seq., it will be seen that in this form of my invention the forming head 10 moves relatively to a stationary pallet 11 supported on the earth or some similar basal substructure.

The forming head comprises the two similar side members 12, structurally communicating with and positioned by the upper cross-piece 50 in the rear and the cross-piece 51 in the front. For utility and structural rigidity and economy, I prefer to construct these members to the relative size and shape illustrated from a relatively heavier metallic framework covered with sheet metal.

An inner side piece 52 is provided on the inside of the side member 12 creating a shelf thereagainst for support of components.

The mechanical top finisher 53 is supported upon this shelf near the rearward portion of the machine. This member 53 comprises the elongate shaft 54 journaled in the bearings 55 supported by said shelf, and non-rotatably carries the driving pully 56 and two eccentric journals 57 near each of its ends. The eccentric journals 57 in turn structurally communicate with and adjustably support the elongate blade-like screed or tamping member 58 at or near its ends.

The two eccentrics 57 on a shaft 54 should be substantially diametrically similar as to eccentricity for best results. I prefer to use two such members 53 in my machine, preferably spaced about a foot apart, and so arranged that when the screed 58 of one is in its furthest downward extension the other is in its furthest upward extension. This causes somewhat of a kneading action on a concrete product and produces a force tending to opposite the friction force between formed product and forwardly moving forming head. Power to operate the top finisher 53 is provided by the motor 59 acting through the belt 60 communicating with the driving pully 56.

A bin-like hopper 61 for concrete is adjustably mounted between side members 12 with a rectangular lower opening 62 positioned to deposit contained concrete over the forward portion of the forming vibrator tubes 27. An agitator 63 comprising the shaft 64, non-rotatably carrying the radially extending paddles 65, is journaled in the side of the hopper 12 of my machine and rotates in the lower opening thereof 62 to aid in carrying concrete concrete contained in the hopper 61 through the lower opening 62. This agitator 63 is powered by the motor 66 acting through the belt 67 and the drive pully 68 non-rotatably carried by the shaft 64.

The vibrator tubes 27, in this instance six in number, are mounted rigidly by the support 26 to the cross member 69, as hereinbefore provided. I prefer to adjustably mount the support 26 on the sides 12 by a spring mounting 70 to provide for substantial vibration isolation. The vibrators 28 are identical with those heretofore described.

I provide a side form 80, usually of a planar vertical type, to form the side of my product. This form 80 is preferably adjustably carried by the lower portion of the forming head 10 of my invention, and if some slight vibration be desired in this member, it may be provided by mounting the member rigidly to the vibrator support 26.

In this form of my invention a stationary pallet 71 for support of the product is provided; it rests preferably upon the earth or some similar basal support (not shown). A metal angle 72 or similar side member is provided along the side edges of the pallet 71 for rigidity and to provide a durable way for passage of the forming head wheels 73.

The sides 12 of the forming head 10 near their ends carry the wheels 73, adapted to roll upon the upper surface of the metal angles 72 to move the forming head 10 over the pallet 71 parallel to its length. The forward pair of wheels 73a are preferably non-rotatably mounted on the single axle 74, but, of necessity, the rearward wheels 74a must each be journaled independently in the side member without a common axle extending therebetween, or the head 10 could not move over the formed product (not shown).

Motive power for the wheels 73 is provided by the motor 75 communicating with the drive pully 76 of the forward axle 74 by means of the belt 77. If a form of my invention be relatively large, there may be sufficient friction between the wheels 73 and the pallet 71 to propel the head 10, and in this instance it may be necessary to provide a rack and pinion type drive (not shown).

I provide the forward positioning wheels 79, having vertically oriented axles, said wheels adapted to run upon the outer surface of the pallet 71, to maintain the forming head 10 in a properly oriented position as it moves over the pallet 71.

I have found it convenient to provide my invention with a hydraulic system and spray heads 78 to wet the pallet 71 for easy removal of product and the top of the product for finishing.

In operation, this form of my invention is used essentially as the other, but here the forming head 10 is moved relative to the pallet 71 as the product is formed. The lowermost edge of the lower opening 62 of the hopper 61 is preferably maintained at a predetermined height above the pallet so that an excessive amount of concrete not needed in the product formation will not be released.

It is to be noted that this form of my invention admits of the making of formed product of any given length and may readily be adapted to either pre-stressing or post-stressing of the product.

Although the foregoing description is necessarily of a detailed, specific character, in order that a specific embodiment of my invention may be set forth, it is to be understood that this specific terminology and structure is not intended to be restrictive or confining, and that various rearrangements of parts and modifications of detail may be resorted to without departing from the essence, scope or spirit of the invention set forth and hereinafter claimed.

Having thusly described my invention, what I desire to protect with Letters Patent and, what I claim is:

1. In a concrete forming machine of the nature aforesaid, for the formation of hollow elongate products, having longitudinally extending central chambers, the combination of a forming head having side members structurally communicating with each other, the lower portion thereof being adapted to form the sides of said product; a vibrator support communicating between said sides carrying a plurality of elongate, pipe-like vibrator tubes, having their axes parallel to the longer dimension of said sides, with physical constants such that the natural period of vibration thereof is substantially at a nodal point at the forward portion of said vibrating tubes and substantially at maximum amplitude near the rearward portion thereof; vibrating means in said tubes and a power source to cause vibration therein; an elongate flat sheet-like pallet associated with said forming head so as to support the product formed thereby; and means of relatively moving said pallet and said forming head parallel to each other so that product formed on said pallet is carried from said forming head as formed, wherein said vibrating means comprises two similar mating cylindrical shell-like body members, having means of attachment to each other and forming a cylindrical chamber therebetween when mating, said members carrying axially aligned bearings in each of the opposed end portions thereof, said bearings being held in position by bearing caps fastened to said body; a ball bearing carried about the central inner periphery of said chamber by a channel therein, said bearing carrying about the inner race thereof an eccentric weight free to rotate thereabout in said chamber; and a central driving shaft supported by aforesaid bearings, having diametrically opposed, radially extending keys, radially, immediately inward from aforesaid weight, adapted to cause said weight to rotate upon rotation of said shaft.

2. In a concrete forming machine of the nature aforesaid the combination of a forming head having elongate side members structurally communicating by cross-pieces; a plurality of pipe-like vibrator tubes, having physical characteristics such that the natural resonant vibration thereof is substantially at a nodal point at the forward portion of said vibrator tubes and substantially at maximum amplitude near the rearward portion thereof; carried below a vibrator cross-piece supported between said side members; vibrators carried within said vibrator tubes and means communicating therewith providing vibratory power thereto; a hopper positioned between said sides with an opening in the lower portion thereof positioned to deposit matter therein over the forward portion of said vibrator tubes; means carried within said lower hopper opening adapted to aid the passage of matter therethrough; tamping means carried between said side members adapted to smooth and tamp the upper surface of a formed product; a plurality of wheels carried by said forming head extensible therefrom adapted to support and move said forming head over a pallet; a flat, elongate pallet adapted to form the lower surface of a formed concrete product and to movably support said forming head; means of moving said forming head relative to said pallet and parallel side members adapted to form the sides of a formed product, wherein said vibrating means comprises two similar mating cylindrical shell-like body members, having means of attachment to each other and forming a cylindrical chamber therebetween when mating, said members carrying axially aligned bearings in each of the opposed end portions thereof, said bearings being held in position by bearing caps fastened to said body; a ball bearing carried about the central inner periphery of said chamber by a channel therein, said bearing carrying about the inner race thereof an eccentric weight free to rotate thereabout in said chamber; and a central driving shaft supported by aforesaid bearings, having diametrically opposed, radially extending keys, radially, immediately inward from aforesaid weight, adapted to cause said weight to rotate upon rotation of said shaft; and means of rotating said central shaft.

References Cited by the Examiner

UNITED STATES PATENTS

| | | | |
|---|---|---|---|
| 1,920,716 | 8/33 | Schafer. | |
| 2,116,708 | 5/38 | Niekamp | 259—72 |
| 2,278,839 | 4/42 | Douglass | 25—1 |
| 2,614,312 | 10/52 | Rankin | 25—41 XR |
| 2,679,384 | 5/54 | Livingston et al. | 259—1 |
| 2,818,790 | 1/58 | Canfield | 25—32 |
| 2,822,598 | 2/58 | Chanlund et al. | 25—41 XR |
| 2,938,255 | 5/60 | Oakden | 25—41 |
| 2,970,361 | 2/61 | Brown | 25—99 |

FOREIGN PATENTS

| | | |
|---|---|---|
| 793,942 | 4/58 | Great Britain. |
| 845,910 | 8/60 | Great Britain. |
| 158,013 | 8/54 | Australia. |

ROBERT F. WHITE, *Primary Examiner.*